United States Patent [19]

Pithouse et al.

[11] Patent Number: 5,002,822
[45] Date of Patent: Mar. 26, 1991

[54] RECOVERABLE ARTICLE FOR ENCAPSULATION

[76] Inventors: Kenneth B. Pithouse, Allee Gauguin, L'Ermieage, 91940 Lesulis, France; Thomas A. Kridl, 4850 Kenwood St., Union City, Calif. 94587; James T. Triplett, 2801 Superior Dr., Livermore, Calif. 94550

[21] Appl. No.: 168,722

[22] Filed: Mar. 16, 1988

Related U.S. Application Data

[62] Division of Ser. No. 925,349, Oct. 30, 1986, Pat. No. 4,761,193, which is a division of Ser. No. 567,130, Dec. 30, 1983, Pat. No. 4,626,458.

[30] Foreign Application Priority Data

Jan. 6, 1983 [GB] United Kingdom ............ 8300221
Aug. 16, 1983 [GB] United Kingdom ............ 8322004

[51] Int. Cl.$^5$ .................................................. B32B 27/12
[52] U.S. Cl. .............................. 428/286; 156/272.2; 156/273.5; 174/DIG. 8; 427/44; 428/34.9; 428/36.1; 428/245; 428/290
[58] Field of Search ........... 428/34.9, 36.1, 245, 428/286, 290; 156/272.2, 273.3, 273.5; 427/44; 174/DIG. 8

[56] References Cited

U.S. PATENT DOCUMENTS

| | | | |
|---|---|---|---|
| 2,027,962 | 1/1936 | Currie | 174/DIG. 8 |
| 3,086,242 | 4/1963 | Cook et al. | 264/DIG. 17 |
| 3,223,764 | 12/1965 | Kahn et al. | 264/178 |
| 3,235,289 | 2/1966 | Jones | 285/21 |
| 3,425,020 | 1/1969 | Toyooka et al. | 338/208 |
| 3,466,210 | 9/1969 | Wareham | 156/86 |
| 3,526,683 | 9/1970 | Heslop et al. | 264/22 |
| 3,597,372 | 8/1971 | Cook | 264/DIG. 17 |
| 3,649,405 | 3/1972 | Osborn | 156/244 |
| 3,669,157 | 6/1972 | Woodall, Jr. et al. | 138/123 |
| 3,673,295 | 6/1972 | Winchklhofer et al. | 264/342 R |
| 4,024,002 | 5/1977 | Lott | 428/913 |
| 4,095,760 | 6/1978 | Sommer et al. | 428/913 |
| 4,107,381 | 8/1978 | Butzow et al. | 428/365 |
| 4,146,417 | 3/1979 | Drelich et al. | 428/288 |
| 4,271,329 | 6/1981 | Perelmuter | 428/36 |
| 4,281,689 | 8/1981 | Benedyk | 129/420 A |
| 4,282,397 | 8/1981 | Siedenburg et al. | 174/92 |
| 4,342,800 | 8/1982 | Changani et al. | 428/36 |
| 4,409,426 | 10/1983 | Nolf et al. | 174/21 R |
| 4,425,174 | 1/1984 | McLouglin | 156/85 |
| 4,478,252 | 10/1984 | McLoughlin | 428/36 |

FOREIGN PATENT DOCUMENTS

| | | |
|---|---|---|
| 0046346 | 2/1982 | European Pat. Off. |
| 2028566 | 12/1970 | Fed. Rep. of Germany |
| 3150544 | 6/1983 | Fed. Rep. of Germany |
| 52-25290 | 3/1974 | Japan |
| 52-56393 | 5/1977 | Japan |
| 53-13805 | 5/1978 | Japan |
| 1005951 | 9/1965 | United Kingdom |
| 1088572 | 10/1967 | United Kingdom |
| 1341114 | 12/1973 | United Kingdom |
| 1440524 | 8/1976 | United Kingdom |
| 1497051 | 1/1978 | United Kingdom |
| 2019120 | 10/1979 | United Kingdom |
| 2069773 | 8/1981 | United Kingdom |
| 2075991 | 11/1981 | United Kingdom |

OTHER PUBLICATIONS

Polymers and Resins, Their Chemistry and Chemical Engineering by Brage Golding, Ph.D., D. Van Nostrand Co., Inc., 1959, p. 382.
Encyclopedia of Polymer Science and Technology, Plastics, Resins, Rubbers, Fibers, vol. 2, 1965, pp. 339–345.
"High-Shrinkage Polypropylene Fibre" by Judge and Nebe, Plastics and Rubber: Materials and Applications, Aug. 1980, pp. 139–144.
"The Preparation of a New Type of Synthetic Fiber. . . ", Bull. Inst. Chem. Res., Kyoto Univ. vol. 52, No. 2, 1974, pp. 436–441.
"Crosslinking of Ultra-High Strength Polyethylene Fibers. . . " Polymer Bulletin 5, 1981, pp. 317–324.
Verpackungs-Rundschau 29 (1978) Nr5 Techn.-Wiss. Beilager, pp. 33–39.

Primary Examiner—James Seidleck

[57] ABSTRACT

A recoverable article comprises a recoverable fabric, means for rendering the fabric impervious, and a shaped liner. The assembly can be used to form a pressure resistant splice case for telecommunications cables.

9 Claims, 3 Drawing Sheets

RECOVERABLE ARTICLE FOR ENCAPSULATION

This application is a divisional of copending application Ser. No. 925,349 filed Oct. 30, 1986, now U.S. Pat. No. 4,761,193 which is a divisional of application Ser. No. 567,130 filed Dec. 30, 1983, now U.S. Pat. No. 4,626,458. The disclosure of each of those applications is incorporated herein by reference.

The present invention relates to environmental protection of junctions in elongate substrates, such as splices in cables, particularly in telecommunications cables.

It is frequently necessary to protect such junctions against the environment in order that the cables or other substrates may continue to function properly. Protection generally has to be provided against moisture, corrosive chemicals as well as insect and animal damage etc. The intention when enclosing a junction such as a cable splice is to make good the original cable insulation that had to be removed in order to connect the conductors, and it is generally required that the life-time of the seal provided by the new enclosure be comparable to that of the original cable insulation. It will be appreciated therefore that the material of the enclosure must provide a highly resistant barrier for a considerable period of time.

One way of providing such a barrier is to install around the cables a splice case comprising an imperforate sleeve of a modified polyolefinic material in conjunction with a high performance adhesive. Such sleeves are conveniently produced by extruding a continuum of material. The sleeve is preferably made recoverable so that it can be shrunk (or otherwise recovered) into close contact with the cables.

There is a further consideration relevant to the design of enclosures for cable splices, and that is the ability to retain pressure. Many types of cables and splice cases are pressurised during use, are assessed in terms of pressure retention to determine their quality, or become subject to incidental pressurisation during use. The importance of this consideration is of course different in each of these three situations, but it is accepted that the ability to retain some degree of pressure is a necessary feature of a splice case if environmental protection is to be achieved.

The most stringent requirements are for a splice case for pressurised cables, such as main cables in a telecommunications system. These cables are pressurised to prevent ingress of water in the event of damage and to provide a means of fault detection. Here the product must withstand a pressure of the order of 10 psi (70 kPa) throughout its life, and a functional test designed to mirror such long term performance requires impermeability at, say, 70 kPa over 10 eight hour cycles between −40° C. and +60° C. in air (Bell cycle). An alternative cycle is in water over four hours at 105 kPa between 5 and 50° C. In addition to this cyclical environmental test, the product may be tested for integrity by pressurisation at 150 kPa in water for about 15 minutes at 23° C. No leak should be observable. A product that is to operate continuously at pressure should also possess long term creep resistance if it is not to become significantly distorted during use.

In telecommunications distribution cables, for example, an ability to retain pressure is required as an indication of completeness of environmental sealing, although the cables are not pressurised during use. Various temperature/pressure cycles have been devised for this purpose, and one that is preferred is a modified Bell Cycle which involves temperature variation from −40° to 60° C. over 8 hours at an air pressure of 40 kPa. The splice case should show no leak after 10 cycles. An alternative cycle is a temperature variation between room temperature and 70° C. at a pressure of 105 KPa over 4 hours.

These and other cable splice cases may become pressurised through being exposed to sunlight, or through the heat involved in the last stages of heat recovery when the seals to the cable have been formed. In such cases it is necessary that the splice case be able to maintain this temporary, and generally rather low, pressure if the environmental seal is not to fail.

Many of today's splice cases for pressurised cables are large and heavy, and consist of many components. For example, cast iron case halves are bolted together around the cable splice, the cable entries being sealed by a complex arrangement of compression collars, clamps, sealing washers and tape. Variations on this system exist but there remains the problem of sealing the cables to the splice case at their points of entry. A large stock of parts must be kept if various sizes of cables are to be joined, or if the number of cables per splice case is likely to vary. A further problem is that installation is difficult and lengthy. The problems associated with such multi-part, rigid, splice cases are avoided by the use of recoverable sleeves: installation is quick, and a variety of sizes and numbers of joined cables can be enclosed with a small number of parts. The use of a continuum of a suitable polymeric material, together with an adhesive can provide excellent environmental sealing and pressure retention. The sleeve is preferably used in conjunction with a liner which surrounds the cable splice and underlies the sleeve. The liner provides mechanical strength, gives the splice case its shape, facilitates re-entry, and may protect the conductors from damage during heat recovery.

However, in unfavourable circumstances and where pressure retention is a primary design consideration, it may be thought desirable to increase the wall thickness of such recoverable polymeric sleeves in order to ensure no movement or creep over long periods of time. A greater wall thickness unfortunately makes the product more difficult and thus more costly to manufacture, due to cost of material and to problems in cross-linking and expanding the material. Also, heat-shrinkage of a thick-walled product takes longer, and requires a more careful application of heat if damage to the cables or other substrates is to be avoided.

What we have now discovered is that a splice case or other hollow pressure vessel capable of high pressure retention can be made from a recoverable fabric.

Thus, the invention provides an assembly for enclosing a junction between elongate substrates, especially between cables, which comprises:
(A) a sleeve comprising a recoverable fabric;
(B) means for rendering the fabric substantially impervious when the fabric is recovered; and
(C) a liner for the sleeve, the liner having a central region of larger cross-section, and end regions of smaller cross-section which provide transitions from the central region to the substrate and which locate the liner with respect to the substrate.

The invention also provides a junction between two elongate substrates, especially a splice between two cables, enclosed by the assembly of the invention.

The invention also provides a method of making a hollow pressure vessel around an elongate substrate, which comprises:

(A) providing around the substrate a hollow article having at least one recoverable outlet portion such that the substrate extends through said outlet portion, the article comprising a composite structure recoverable by virtue of a recoverable fibre component thereof;

(B) recovering into engagement with the substrate one or more outlet portions only of the structure.

The substrate may be a cable splice in which case the hollow article will have two outlet portions (or more if spare blanks are provided for future use or if a branch-off is to be sealed). Where a cable termination or radial type closure is provided, the article may have a single outlet.

The extent to which the fabric need be impervious will of course depend on the use of the assembly. Where the assembly is used to seal a splice between pressurized cables a high imperviousness will be desirable if energy and pressurization medium are not to be wasted. In other situations imperviousness to water, oil, fuel or hydraulic fluids may be required. A degree of perviousness will, in general, be tolerable depending on the nature of the substrate and on the length of time that the assembly will be in use.

The means for rendering the fabric substantially impervious may, for example, be a polymeric material used in conjunction with, bonded to, or extending throughout the recoverable fabric, or it may be the liner where the liner is of substantially sheet form rather than, say, a cage, or it may be some means whereby the nature of the fabric is altered. The first of these possibilities is preferred, and we therefore prefer that a true composite structure be formed between the recoverable fabric and a polymeric matrix material by means of which it is rendered impervious. We prefer that the matrix material and the fibre material be chemically and/or physically compatible. By physically compatible we mean that the relevant properties of the two materials are similar or identical during lamination, recovery and use. Chemically similar materials are preferred, for example both fibre and matrix may be polyolefins, and preferred materials are high density and low density polyethylene respectively. The skilled man would be able to select other suitable pairs of materials. We have found that a recoverable fabric rendered impervious can have excellent pressure rentention where imperviousness to air is required. The ability of the sleeve to retain pressure is not simply a question of porosity of the material, although it must ultimately be substantially free from holes, but is determined also by the ability of the material to withstand hoop stresses that are generated by pressure within the sleeve. It is with regard to this second effect that recoverable fabrics have been found to be particularly good. Fabric sleeves of small thickness have been found to be able to resist high pressures without significant ballooning or creep. It is furthermore surprising that this beneficial feature can be made use of in spite of the initial porosity of fabrics.

Fabrics also offer considerable advantages over, say extruded, sheets in the ease with which they can be reinforced by the insertion of special fibres.

The sleeve and any liner may each be made in tubular form or wrap-around form. Wrap-around sleeves and liners are preferred since they can be installed around substrates having no free ends. This is particularly useful when a splice in a telephone cable is to be enclosed after the repair of only a few of the many conductors it contains. If the sleeve and liner were tubular, the entire cable would have to be severed for installation. Wrap-around products are also useful where space is limited; a wrap-around sleeve can be installed where the amount of substrate exposed merely equals the width of the sleeve, a tubular sleeve however requires room for it to be positioned along the substrate away from the splice region while the splice is being made.

The techniques by which the sleeve may be held in the wrapped configuration can be regarded as of four broad types. Firstly, a lap or other bond may be made between opposing edges of the sheet, optionally with a patch to prevent peel-back. Here the bond will generally be between opposing regions of the polymeric matrix material used to render the fabric impervious, and one must therefore ensure that the recovery forces are properly transmitted from the fibres to the matrix material.

In a second possibility, some means which penetrates the fabric may be used, for example stitching, stapling, riveting, the use of pre-inserted catches such as press-studs, or the use of means may be positioned adjacent a lap joint in the sheet and which has a plurality of projections which penetrate the sheet. The means which penetrates the sheet may join a closure element to each edge, which closure elements then hook or otherwise join together.

The third method of closure involves forming the edges of the sleeve in such a way that they may be held together by some form of clamping means, such as the C-shaped channel disclosed in UK patent No. 1155470, or by a re-useable tool.

The last closure technique to be mentioned comprises forming the fabric in such a way that the recoverable fibres do not terminate at the opposing edges to be joined, but instead double back. An example is to use a recoverable weft on a shuttle loom and insert a closure member into the weave at each edge. A further possibility is to weave closed pockets at each edge of the sleeve.

Several matters are to be borne in mind when designing the recoverable sleeve, and the first to be considered will be recovery ratio. The recovery ratio should be sufficient to allow the sleeve to be installed over the largest parts of the substrate and to recover into contact with the smallest parts. In a splice between telephone cables, the splice bundle will in general be from 2–6 times the cable diameter, and a sleeve having a recovery ratio of at least this size will be suitable. The sleeve preferably does not recover into engagement with the splice bundle, since if it did damage would result. Also, it is desirable that the splice case be re-enterable without damage. Thus, the final structure is preferably hollow. The extent of recovery can also be expressed by quoting the change in a dimension as a percentage of the recoverable dimension before recovery. Expressed thus, recovery is preferably at least 20%, more preferably at least 40%, particularly at least 50%, more particularly at least 75%. A sleeve having a lower recovery ratio than the ratio between the size of the splice and that of the cables may be used if the sleeve is made in a shape more or less corresponding to the shape of the cable splice. If a shaped sleeve is used it will usually have to be wrap-around since it will not be capable of being slid over the splice bundle. Since greater recovery may be needed at the ends where the sleeve is to seal to the cables, the fabric may be made having zones of higher and lower recovery. This may be achieved by using zones of different fibres or a single fibre type that has been differentially treated, such as by subjecting it to different degrees of irradiation. The differential treatment may comprise the differential incorporation of prorads or antirads, since in this way, unform irradiation will produce zoning of recovery ratio or of recovery stress.

The type of fibres and construction of the fabric will now briefly be considered, although it is envisaged that any weave or knit or non-woven agglomeration of any fibres may be used providing the required degree of recovery can be induced and providing the fibre density is sufficiently high that the fabric can be rendered substantially impervious. For the present purposes the term weave is to include braids, since the products are similar although the methods of production are different; the terms warp and weft are not strictly applicable to braids but when used herein with reference to weaves can be considered to relate also to braids by arbitrary selection of fibre directions. Recoverability is preferably provided by weaving or knitting fibres that are already recoverable, rather than by deforming a fabric woven or knitted from dimensionally stable fibres. In the first of these possibilities, the recovery ratio of the fabric will depend not only on the recovery ratio of its fibres, but also on the type of weave or knit and on the means employed to provide substantial imperviousness.

The article as a whole will therefore recover, on heating or other treatment, towards an original shape from which it has previously been deformed, or towards a new shape governed by the recovered configuration of the fibres it contains, or towards another a new configuration from which the article as a whole has not been previously deformed.

The article will generally comprise a shrinkable (preferably heat-shrinkable) sleeve comprising preferably polymeric fibres exhibiting (in the final product at least) the property of elastic or plastic memory, which property is described, for example, in U.S. Pat. Nos. 2,027,962; 3,086,242 and 3,597,372. As is made clear in, for example, U.S. Pat. No. 2,027,962, an original dimensionally heat-stable form may be a transient form in a continuous process in which, for example, an extruded tube is expanded (or in the present case a fabric tube is expanded or fibres are stretched, generally during their formation) to a dimensionally heat unstable form in a separate stage.

In the production of polymeric heat-recoverable articles in general, the polymeric material may be cross-linked at any stage in the production of the article that will improve temperature stability while enhancing the desired dimensional recoverability. One manner of producing a heat-recoverable article comprises stretching or shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

When the fibre is cross-linked by irradiation it is convenient to incorporate the cross-linking step into the overall manufacture of the fibre. The fibre can be extruded, stretched at a temperature below its melting temperature, preferably by an amount of from 800–2000, then subjected to irradiation to effect cross-linking. A less preferred way of making the fibre is to extrude the material, irradiate to cross-link, then heat the fibre preferably to above its melting temperature, stretch the fibre, and then cool. HDPE fibres are preferably irradiated with a dose of from about 5 to about 35 megarads, more preferably from about 5 to about 25 megarads, and most preferably from about 7 to about 18 megarads especially from 10 to about 18 megarads. The gel content that results is preferably at least 20%, more preferably at least 30%, and most preferably at least 40% . In practice a maximum of about 90% will be sufficient for most purposes.

In other articles, as described, for example, in British Patent No. 1440524, an elastomeric member is held in a stretched state by a second member, which, upon heating weakens and thus allows the elastomeric member to recover.

When recoverable by heat, the recovery temperature is preferably 60° C. more, more preferably from 80°–250° C., such as 120°–150° C.

In general, the fabric will be constructed so that the recoverable fibres can effectively run at least in the direction where recovery is required. In a weave, therefore, the warp only, or the weft only, or both weft and warp, may be recoverable. In more complicated weaves, such as a triaxial weave, one or both of the warps may be recoverable. An advantage of the use of fabrics is that perfect uniaxial recovery, or a chosen split in recovery between two directions, may be achieved. Where the fabric is knitted, use of a recoverable fibre will produce recovery in all directions, although selective recovery can be provided by controlled warp or weft insertion.

Different effects, in terms of for example, final recovery ratio, strength and flexibility, will result from different types of weave or knit even if the same fibres are used. Examples of type of weave include plain, twill, broken twill, herring bone satin, sateen, leno, hop sack, sack, matt and combinations of these. The weave may be single ply, or if higher density or thicker fabrics are desired multiple ply weaves may be used. For the present preferred purposes, where a warp recoverable fabric is to recover over a liner having a transition, high warp recovery combined with low crimp in any single weft insertion is required. Hence fabrics of high float, such as satins or sateens, which can accommodate high weft density combined with low crimp, and which retain excellent recovery are to be preferred.

The fibres used to produce the recoverable fabric may be monofilaments, multifilaments or spun staple yarns. Greater flexibility can be attained using multifilament yarns, although problems can be encountered in cross-linking due to the high surface area. Examples of polymeric materials that may be used include polyolefins such as polyethylene (especially HDPE) and polypropylene, polyamides, polyesters and fluoropolymers such as FEP, ethylene perfluoro copolymer, polyvinylidine fluoride and TFE copolymers. The recovery temperature, by which we mean the temperature at which recovery will go substantially to completion, is preferably 60° C. or more, more preferably from 80°–250° C., most preferably from 120°–150° C.

A non-recoverable fibre may be used as a reinforcement or supplement to the recoverable fibres, or may constitute the major component in one or more dimensions of the fabric. The following non-recoverable materials may be regarded as illustrative: glassfibres, carbon fibres, wires or other metal fibres, polyesters, aromatic polymers such as aromatic polyamides for example Kevlar (trade name), imides and ceramics. The non-recoverable component may be permanent, giving the recovered article enhanced strength etc., or may be present in discrete form only to locate the recoverable component during installation.

The means by which the fabric is rendered substantially impervious may be a polymeric matrix material which extends throughout the fabric, and the following discussion is in terms of the use of a polymeric material. Such a system, which is disclosed in UK Patent application No. 8300218, preferably comprises a composite structure of a heat-recoverable fabric and a polymer matrix material wherein:

(a) the heat recoverable fabric comprises fibres that will recover when heated, the fibres having a recovery stress Y of at least $5 \times 10, -2$ preferably at least $5 \times 10 - 1$ more preferably at least 1 MPa at a temperature above their recovery temperature; and (b) the polymer matrix material has an elongation/temperature profile such that there exists a temperature (T) which is at or above the recovery temperature of the fibres at which temperature the polymer matrix material has an elongation to break of greater than 20% preferably greater than 100%, especially from 400–700% and a 20% secant modulus X of at least $10^{-2}$ MPa (measured at a strain rate of 300% per minute), and at which temperature the inequality is satisfied:

$$\frac{X}{Y}\left(\frac{1-R}{R}\right), \text{ is less than one, preferably less than 0.5, more preferably less than 0.05.}$$

wherein R is the mean effective volume fraction of heat-recoverable fibres in the composite structure along a given direction based on the total volume of the composite structure, or relevant portion thereof.

In a further embodiment, components (A) and (B) of the invention are provided by a recoverable composite structure comprising a cross-linked polymeric material and cross-linked recoverable fibres by virtue of which the composite is recoverable.

Such a recoverable composite structure can be made by applying to the cross-linked recoverable fibres the polymeric material, and then cross-linking the polymeric material.

The fibres are desirably cross-linked to increase their post-recovery strength, and a recovery stress of at least 1 MPa, preferably 1.5 to 5 MPa will generally be suitable. The polymeric material is desirable cross-linked to prevent it dripping or running during heat recovery, particularly during heat recovery by means of a torch. Too much cross-linking of the polymeric material will, however, reduce the recovery ratio of the composite structure. This can give rise to a problem since a different extent of cross-linking treatment may be required in the fibres and the polymeric material. This is the reason for the two cross-linking steps being carried out separately in the embodiment just described. The problem may arise due to different cross-linking responses (beam response in the case of irradiation cross-linking, for example) of the types of material used for the fibres and the polymeric material, or it may result from the treatment undergone by the fibres and polymeric material. This second effect includes the reduced beam response of the fibres that results from their molecular orientation produced by drawing to make them recoverable.

The composite structure may, nonetheless, be produced using a single cross-linking step if the beam response of the recoverable fibres relative to that of the polymeric material in such that a post-irradiation recovery stress of the fibres, per se, of at least 1 MPa can be reached before the recovery ratio of the composite structure is reduced to a value of 70% of that of the unirradiated composite structure.

The relative beam response may be produced by the presence of prorads in the recoverable fibres and/or antirads in the polymeric material.

In a preferred embodiment of the invention the fabric is incorporated into a flexible recoverable composite structure comprising the recoverable fabric and a polymeric matrix material laminated therto, in which:

(a) the recoverable fabric comprises a cross-linked recoverable polyolefin having a recovery stress of 1.5 to 5 MPa (b) the matrix is cross-linked such that the recovery ratio available in the composite is at least 65% of that available in the free fabric, and the polymeric matrix material, per se, after irradiation has room temperature elongation 400–700% measured at a strain rate 300%.

Irradiation, in addition to providing one means of cross-linking, can provide other features in the composite structure. If the fibres are irradated, particularly in the presence of oxygen, before application of the polymeric material then a change in the surface properties of the fibres may occur (such as oxidation) which improves adhesion between the fibres and the polymeric material. An irradiation step after application of the polymeric material may also aid such bonding by forming a cross-linked bond between the two components of the composite structure.

The polymeric matrix material may be thermoplastic or elastomeric. Example of thermoplastic materials include: ethylene/vinyl acetate copolymers, ethylene/ethyl acrylate copolymers, LLDPE, LDPE, MDPE, HDPE, polypropylene, polybutylene, polyesters, polyamides, polyetheramides, perfluoroethylene/ethylene copolymers, and polyvinylidene fluoride The following is a list of preferred elastomeric materials: ABS block copolymers, acrylics including acrylates, methacrylates and their copolymers, high vinyl acetate copolymers with ethylene, polynorbornene, polyurethanes and silicone elastomers. These materials (or part of them) are preferably cross-linked, and this is conveniently carried out by subjecting the fabric to a suitable cross-linking agent after the fabric has been rendered impervious by incorporating the polymeric material.

The material can be cross-linked by irradiation or by other means such as chemical cross-linking using, for example, a peroxide cross-linking agent, provided that the physical properties of the matrix at the recovery temperature of the fibres are as required after the cross-linking step. Where irradiation is used a dose of 10 megarads or less, in particular from 3–7 megarads is preferred. The recovery ratio of the resulting composite structure after irradiation is preferably at least 50%, especially at least 70% of that before irradiation. These dose values may be regarded as typical for olefinic polymers of low orientation, and the skilled man will be able to select suitable doses depending on the presence of various concentrations of prorads or antirads, if any.

The precise technique by means of which the fabric is rendered substantially impervious will of course depend on whether, for example, a polymeric material is simply used in conjunction with the fabric, is adhered to a surface (preferably an inner surface) of the fabric, extends throughout the fabric, or is introduced in some other way. The extent of mechanical interaction required between the fabric and the polymeric material will depend on the extent of bonding that can be achieved during manufacture, and this is a function of the difference between the melt or softening temperature of the polymeric material and the recovery temperature of the fabric. Unless a further stretching operation is to be carried out later, recovery should not occur at this stage. Recovery could of course be avoided by mechanically holding the fabric, but this tends to make incorporation of the polymeric material rather complex. Suitable techniques for coating the fabric with a polymeric material which achieve at least some penetration include press lamination, hot coating from the melt between rollers, spray coating, dip coating and powder coating.

The amount of polymeric material used should be sufficient to render the fabric substantially impervious to air when it is recovered. It is possible, therefore, for the polymeric material to be a discontinuous coating or impregnation before recovery, and optionally to melt or soften sufficiently and be brought together on recovery to provide a substantially impervious barrier. We prefer, however, that the composite of fabric and polymeric material be substantially impervious before as well as after recovery. The thickness of the polymeric material should be great enough to allow the desired pressure, if any, to be retained, but small enough to allow the fabric to recover to the desired extent. The composite desirably recovers as a unit with no appreciable drawing-through of fabric within the matrix. A suitable thickness of polymeric material is 0-0.6 mm preferaby about 0.3 mm either side of the fabric. We have found that an unstressed layer of a polymeric material of thickness of at least 0.03 mm especially 0.2 to 2.0 mm on an external surface of the fabric provides a considerable improvement in the ease with which the fabric can safely be recovered using a torch such as a propane torch. Such polymeric layer will generally soften during recovery but has a sufficiently high viscosity that is is retained by the fabric. This is disclosed in UK patent application No. 8300217.

The composite is preferably coated with an adhesive on that side which will face the substrate to be enclosed, although the polymeric material providing imperviousness may be adhesive under installation conditions. Heat-activatable adhesives are preferred, especially hot-melt adhesives such as polyamides and EVAs. An ideal polyamide adhesive, which is disclosed in UK patent publication No. 2075991, contains up to 10%, preferably up to 1% of an acrylic rubber and has excellent adhesion to untreated polyethylene, a good low temperature flexibility. The activation temperature of the adhesive should be chosen to correspond to the recovery temperature of the fabric, so that the single step of heating achieves both recovery and bonding. The adhesive need not extend over the entire surface of the sleeve, and in certain situations need only be present at its openings.

A single layer of fabric may be used, or the sleeve may comprise a laminate of two or more layers of fabric, optionally bonded together with a simple layer of adhesive or including a thicker layer interposed between the fabrics.

The other major component which allows the recoverable fabric described above to enclose a substrate such as a cable splice, and which provides impact and other mechanical strength, is a relatively rigid liner. Such liners, which comprise a larger central section and smaller end sections, may be made in many ways. A canister comprising aluminium or other half shells having shaped ends can be provided with hinges or interlocking longitudinal edges for wrap-around installation. This type of canister may be made of sheet material, or may have the appearance of a cage and comprise supporting end rings and a series of longitudinal struts joining them. Such a liner is disclosed in UK patent No. 1431167, the disclosure of which is incorporated herein by reference. An alternative liner may be made from a roll of rather stiff material which is wrapped around the splice with a degree of overlap which depends on the degree of heat and mechanical protection required. The material used may comprise a laminate of cardboard or of a plastics material together with layers for reducing heat or moisture vapour transfer. Such liners may therefore include a support layer (preferably cardboard or plastics material), a foam layer for heat resistance, a metal foil layer for water-vapour resistance, and optionally one or more thin films of a polymeric material for further protection. A liner based on cardboard is described in published UK patent application No. 2059873 and one based on a thermoplastics material is disclosed in published UK patent application No. 2069773. These disclosures are incorporated herein by reference. The structure just described may constitute merely the central or larger part of the liner as required for this invention, the ends which provide the transitions down to the cables being provided by separate end pieces which serve to support the central region and to provide the desired smooth transitions. Alternatively, the longitudinal edges of the roll of liner material may be provided with a series of slits or may be crowned in order that the edge portions of the installed roll may be collapsed to taper gradually down to the cables. The liner is preferably shaped to avoid any sharp angular change between the central portion and the slope, and between the slope and the cables. If the liner has tapered fingers at its ends a gradual, rounded transition is ensured by the gentle increase in flexibility and consequently in bending along the length of each finger. As mentioned above, these fingers may be part of a unitary liner or may constitute or be part of separate end supports which cary the larger central region of the liner. The angle of the transition (that is of the sloping part relative to the axis of the cable) is preferably less than 60° more preferably less than 45°. We have surprisingly found that recoverable fabrics can be produced which are stable over transitions steeper than 60° or more, by which we mean that unacceptable parting of the fibres by sliding down the transition can be avoided. Where a particularly large transition angle is desired, it may be desirable to provide crimp in the fibres running in the direction along the splice case since this reduces the chance of the longitudinal fibres becoming straight and alowing the circumferential recoverable fibres to fall to one side.

The weave type also has an effect, and we have found greater stability for high float fabrics where more longitudinal fibres can be accommodated; hence sateen is preferable to twill, which in turn is better than plain weave.

The liner preferably carries a valve, which may be used to pressurise the splice case of which it forms part, or merely to test pressure. The feature will of course be primarily useful in conjunction with pressurised telephone cables. The valve preferably has a screw-threaded body and is sealed to the liner by means of sealing washers and a nut. The use of a fabric rather than a continuous material as the sleeve has a particular advantage here; it is possible to force a hole (generally after gentle heating) through the fabric without breaking any fibres, and as a result there is no question of any split propagating later during recovery. Even if a hole is drilled or otherwise cut to make way for the valve only a limited number of fibres are severed and the damage will not spread. The valve may be passed through the liner and then through the hole in the fabric sleeve so that its base abuts against the inside of the liner. Various sealing washers are installed and tightened down by means of a nut. Improved sealing can be achieved if the washer which overlies the fabric has a larger hole than the hole in the fabric, since in this arrangement an annular portion of fabric becomes pinched between the top washer and the valve body. The valve can serve also as an earth or screen grounding point, or as a lug for locating the sleeve with respect to the liner. The last of these features is particularly useful where the liner is cage-like; and the sleeve is wrap-around and has a closure which must overlie one of the bars of the cage. For ease of assembly in the field, the sleeve may be supplied attached to the liner or to part of it by means of the valve.

The liner may be constructed to facilitate re-entry, by which we mean at least partial removal of an old recovered sleeve in a way that does not damage the underlying cables, and rebuilding of the splice case with a new recoverable sleeve. One technique is to cut the old sleeve circumferentially at each transition, and longitudinally between the two circumferential cuts. It is therefore desirable that there be a gap between the liner and the underlying cable splice. This allows a central portion of the old sleeve to be removed, leaving behind its ends which remain sealed to the cables. Where the old sleeve was a wrap-around sleeve having an upstanding closure means, it is usual to cut-off this closure means before making the cuts referred to above. After the cable splice has been attended to a new sleeve is installed to bridge the remaining butts of the old sleeve. It is desirable that the central portion of the old sleeve can be removed without destroying the liner. To this end UK patent publication 2093402 proposes that a liner be provided with an overlying moisture-barrier foil layer which can become bonded to the overlying sleeve but which remains separable from the liner.

Where the assembly of the invention is used, for example, to enclose a splice between pressurised cables a further component is preferably included. Pressure within a splice case tends to put any seal or other engagement between the recovered sleeve and the ingoing cables into peel. This problem was recognised and a solution found in UK patent publication 2040106, where it was proposed that one should use one or more flexible auxiliary members interposed between the sleeve and the cable and so positioned as to be able to be deformed by forces generated by the internal pressure so that one portion of the member is forced against the sleeve and another is forced against the cable portion. As a result, peel between the outer sleeve and the cable is replaced by shear between the auxiliary member and the cable and between the auxiliary member and the sleeve. In general, any means will be desirable that can be positioned around the substrate (here a cable) and the outlet portion of the sleeve which can reduce the tendency of the engagement between sleeve and outlet portion to be reduced by the internal pressure.

One embodiment of the auxiliary member disclosed in UK patent publication 2040106 is a strip of substantially U or V shaped cross-section which is wrapped around the cable at the region where the sleeve meets the cable. One limb of the U or V becomes bonded to the cable and the other to the sleeve, with the opening facing into the splice case. The auxiliary member may contain an adhesive, such as a hot-melt adhesive, a strip of foil for heat protection, and release paper to cover the adhesive until it is needed.

An alternative embodiment, which allows the auxiliary member to be cut to a length according to the circumference of the cables, includes a highly elastic rubber or a foram instead of the U or V shaped strip. The rubber or foam is bonded to a strip of adhesive, the other side of which is atached to a strip of aluminium foil. The rubber or foam may be coated with a pressure sensitive adhesive to aid installation. Pressure within the splice case acts on the rubber or foam causing it to splay out against the cable and the sleeve.

Where an enclosure has to be built around a simple end-to-end joint between two cables a simple sleeve can be used which shrinks into contact with each cable. However, problems may arise where two or more cables or other substrates have to be sealed at one position. This problem, which is known as branch-off, occurs in a cable splice where one cable is divided into two. This problem can be overcome by providing means for holding together circumferentially spaced portions of an outlet of the fabric sleeve to close at least partially the crutch region between the diverging cables. The seal is conveniently completed by an adhesive on the inner surface of the sleeve which melts or otherwise becomes activated as the sleeve recovers. A solution is proposed in UK patent publication No. 2019120, where a branch-off seal is formed by:

(a) positioning a clip having at least two elongate legs over the outer surface of a recoverable sleeve at an end thereof so as to form at least two terminal conduits;

(b) positioning substrates within the conduits; and (c) applying heat so as to effect recovery and to form the desired seal.

The branch-off clip preferably has three legs, the central leg being coated with an adhesive and being positioned within the sleeve. This allows a greater amount of adhesive to be provided in the crutch region. The clip, preferably its central leg, may be hollow and provided with a pressure access point, or with means for monitoring temperature in the crutch region.

The problem of branch-off can, however, be overcome by producing the fabric sleeve in the correct shape to accomodate two or more branching substrates. This solution is particularly applicable to fabrics, and offers significant advantages. A fabric can be produced, especially by knitting, which has for example one outlet at one end and two at another end. Such an article can still be wrap-around since closure mechanisms may be provided for each outlet.

An alternative technique involves installing around the cables a flexible seal which comprises an envelope containing a composition which can undergo a change from lower to higher viscosity. The seal transforms the concave surfaces in the crutch region to a flat or convex surface to which the fabric can seal. This is disclosed in copending UK patent application No. 8221597.

The outlet of the sleeve is therefore recovered into engagement with the cables via the intermediary of the flexible seal.

The following example is given to illustrate a pressure vessel built from preferred materials.

Example

The following two HDPE monofilaments are chosen to provide the recoverable component of a variety of different weaves.

|  | Fibre 1 | Fibre 2 |
|---|---|---|
| Mn | 24500 | 19100 |
| Mw | 135760 | 163100 |
| Mz | 459000 | 2060000 |
| Mp | 64400 | 53200 |
| D | 5.378 | 8.510 |
| Initial Modulus (MPa) | 3881.3 | 2959 |
| Tensile Strength (MPa) | 534.4 | 414.9 |
| % Elongation (21° C.) | 21 | 30 |
| Monofilament dia (MM) | 0.38 | 0.29 |

The fibres were irradiated using 6 MeV electrons at a dose rate of 0.24 Mrads/Min.

Table 1, shows the properties of these fibres for various total doses of radiation.

TABLE 1

| | Fibre Properties | | | | |
|---|---|---|---|---|---|
| | | \multicolumn{4}{c}{Radiation Dosage (Mrads)} |
| Fibre | Property | 0 | 8 | 16 | 32 |
| 1 | 100% Modulus (MPa) | | 0.13 | 0.3 | 0.42 |
|  | Tensile Strength (MPa) | | 0.93 | 1.4 | 1.46 |

TABLE 1-continued

| | Fibre Properties | | | | |
|---|---|---|---|---|---|
| | | \multicolumn{4}{c}{Radiation Dosage (Mrads)} |
| Fibre | Property | 0 | 8 | 16 | 32 |
| | Elongation to Break (%) | | 1480 | 924 | 754 |
| | Gel Content (%) | | 27.0 | 58.0 | 67.0 |
| | Recovery Force (MPa) | | 1.17 | 1.2 | 1.3 |
| | Recovery (%) | | 89 | 88.5 | 88.5 |
| 2 | 100% Modulus (MPa) | | 0.27 | 0.21 | 0.34 |
| | Tensile Strength (MPa) | | 1.36 | 1.93 | 2.98 |
| | Elongation to Break (%) | | 752 | 487 | 777 |
| | Gel Content (%) | | 10.0 | 40.0 | 61.0 |
| | Recovery Force (MPa) | | 0.57 | 0.6 | 0.65 |
| | Recovery (%) | | 89 | 87 | 85 |

Each of these two HDPE fibres was woven with a non-recoverable fibre to produce various different weaves. In each case the recoverable HDPE was the warp fibre. Table 2 shows the % recovery for each fabric type. Kevlar, referred to under fabric 11, is a Trade Mark for an aramide fibre yarn.

TABLE II

| | | | Fabric Properties | | | | | | |
|---|---|---|---|---|---|---|---|---|---|
| | | | | | | \multicolumn{5}{c}{% Recovery Radiation Dosage (Mrads)} |
| Fabric | Fiber | Weave Type | Weave Density | Weft Fiber | 0 | 4 | 8 | 16 | 32 |
| 1 | 1 | Twill 2 × 2 | 40/7 | Glass | | 85 | 86 | 85 | 83 |
| 2 | 1 | Twill 2 × 2 | 40/11 | Glass | | 78 | 80 | 86 | 80 |
| 3 | 1 | Twill 2 × 2 | 40/20 | Glass | | 60 | 70 | 77 | 80 |
| 4 | 1 | Twill 2 × 2 | 80/13 | Glass | | 66 | 75 | 74 | 74 |
| 5 | 1 | Twill 2 × 2 | 60/10 | Glass | | 75 | 76 | 78 | 77 |
| 6 | 1 | Twill 4 × 4 | 80/26 | Glass | | — | 55 | 56 | 59 |
| 7 | 1 | Plain (double pick-weft) | 80/7 | Glass | | — | 60 | 62 | 60 |
| 8 | 1 | Twill 2 × 2 | 42/20 | Glass | | | | | |
| 9 | 1 | Hopsack | 40/14 | Glass | | — | 60 | 55 | — |
| 10 | 1 | Twill 2 × 2 | 42/26 | Cotton | | | | | |
| 11 | 2 | Twill 2 × 2 | 90/12 | Glass | | 76 | 76 | 76.8 | 76.8 |
| 12 | 2 | Twill 2 × 2 | 80/12 | Glass | | 77 | 77 | 77.5 | 77 |
| 13 | 2 | Twill 2 × 2 | 60/12 | Glass | | 80.5 | 80 | 79.8 | 79.8 |
| 14 | 2 | Sateen | 70/26 | Glass | | 76 | 77.5 | 77.8 | 77.2 |
| 15 | 2 | Plain (double pick-weft) | 90/6 | Polyester A | | | 75** | | |
| 16 | 2 | Twill 2 × 2 | 90/12 | Polyester A | | | 72.5** | | |
| 17 | 2 | Plain | 90/6 | Polyester B | | | 75** | | |
| 18 | 2 | Twill 2 × 2 | 90/12 | Polyester B | | | 72** | | |

*Shown as warp density fibers per inch/weft density fibers per inch
**Values recorded at 10 Mrads
Polyester A = 1000 denier polyester, m. pt. 220° C.
Polyester B = 840 denier polyester, m. tpt. 220° C.

Fabrics 5 and 11 above were rendered substantially impervious by combining them with various polymeric resins to produce a composite. The resins were in the form of extruded sheets of 0.5 mm thickness with little to no orientation, and lamination was carried out in a press between silicone rubber sheets. The resulting composites were subjected to irradiation with 6 MeV electrons in air at room temperature at a dose rate of 0.24 Mrads/min for times sufficient to produce a radiation dose of 2.4 or 6 Mrads. Table 3 shows the laminating conditions and final percentage recovery for four composites.

TABLE III

| | | | \multicolumn{3}{c}{Laminating Conditions} | |
|---|---|---|---|---|---|---|
| Composite No. | Fabric | Polymer | Temperature (°C.) | Pressure (hg/cm²) | Time (mins.) | % Recovery |
| 1 | 5 | EVA 460 | 105 | 45 | 5 | 70 |
| 2 | 5 | EVA 250 | 100 | 45 | 3 | 69 |
| 3 | 5 | Sclair 2109 | 150 | 22.5 | 5 | 68 |

TABLE III-continued

| Composite No. | Fabric | Polymer | Laminating Conditions | | | |
|---|---|---|---|---|---|---|
| | | | Temperature (°C.) | Pressure (hg/cm²) | Time (mins.) | % Recovery |
| 4 | 5 | DYNH-3 | 150 | 22.5 | 5 | 60 |

The tear strength of each of these fabrics was tested in an Instron tensometer employing a draw rate of 100 mm/min. A strip of composite was used, the length of which ran parallel to the recoverable warp, and the width parallel to the non-recoverable weft glass or kevlar, which is an aromatic polyamide. This test served therefore to measure the strength of the glass and kevlar and to compare them. The strip was used in the Instron as follows. A cut was made lengthwise down the middle of the strip for about three quarters of its length. The two legs that result were then pulled in opposite directions by attaching one to the fixed and one to the moving jaw of the Instron.

In all cases an excellent tear strength in excess of 30N was easily achieved, and for the kevlar based fabric the figure was considerably higher at 150N. This test is regarded as highly demanding since the fibres are being bent through a far sharper angle than would be experienced in a sleeve for enclosing a substrate such as a cable splice.

Components 1 and 4 above were used to produce a splice case suitable for enclosing a splice between two pressurised telephone cables. Four sheets were prepared having thickened portions running along opposite weft edges so that a radially recoverable wrap-around sleeve was produced. These thickened edge portions acted as rails which were later secured together by an elongate channel in the manner shown in UK patent No. 1155470, the disclosure of which is incorporated herein by reference.

Each of these sheets of composite was then coated with a hot-melt adhesive on that side which would be inwardly facing when in the wrapped around configuration. The adhesive used was a polyamide, modified with up to 1% of an acrylic rubber, applied to a thickness of 0.5 mm. The resulting four sleves had the dimensions shown in Table 4, and were for use in conjuction with the cable sizes indicated.

TABLE 4

| Sleeve | Composite | Cable Size | Width between rails | Length | Thickness |
|---|---|---|---|---|---|
| 1 | 1 | 50 pairs | 19 m | 38 cm | .08 cm |
| 2 | 1 | 200 | 33 cm | 38 cm | .08 cm |
| 3 | 4 | 200 | 33 cm | 38 cm | .08 cm |
| 4 | 1 | 400 | 43 cm | 50 cm | .08 cm |

Each of these sleeves was used in conjuction with a liner which comprised an aluminium canister of about 75% of the length of the sleeve and having crowned ends which could be deformed to provide smooth 30° transitions. The diameters of the canisters were chosen to be about 75-90% of the diameter of the assembled sleeve in order to ensure some degree of unresolved recovery. (The recovery ratio of the sleeves was about 4:1, based on the recoverable size and the change in size, which corresponds to a percentage change of 75% and although a wide range is possible we prefer recovery from 20-90%.) Pressure tests were then carried out on splice cases built up using the above liner and sleeves recovered over a polyethylene jacketed telephone cable. The cable had a 0.5 cm hole cut in its jacket for pressure communication with the inside of the splice case. The splice cases were put under pressure of 70 KPa (10 psi) and cycled between −40° and +60° C. for 100 cycles at 3 cycles per day. The splice cases were also tested in water at 105 KPa through 100 cycles between 5° and 50° C. No leaks or breaks were detectable, indicating a high degree of pressure retention. The amount of creep detected was minimal and in some cases not detectable.

The invention is further illustrated with reference to the accompanying drawings, in which.

BRIEF DESCRIPTION OF DRAWINGS

Figure 1:
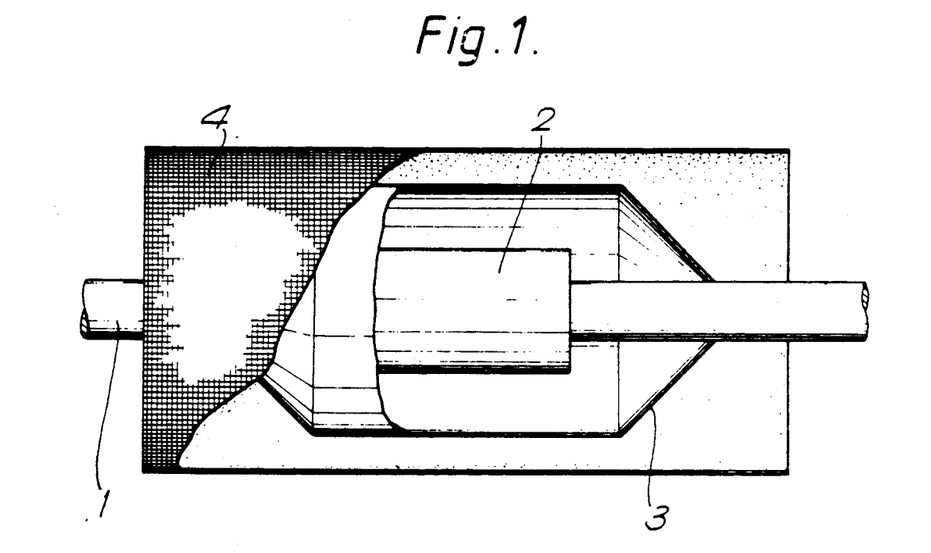
FIG. 1 shows a joint between two substrates surrounded by a liner and an unrecovered tubular sleeve.
Figure 2:
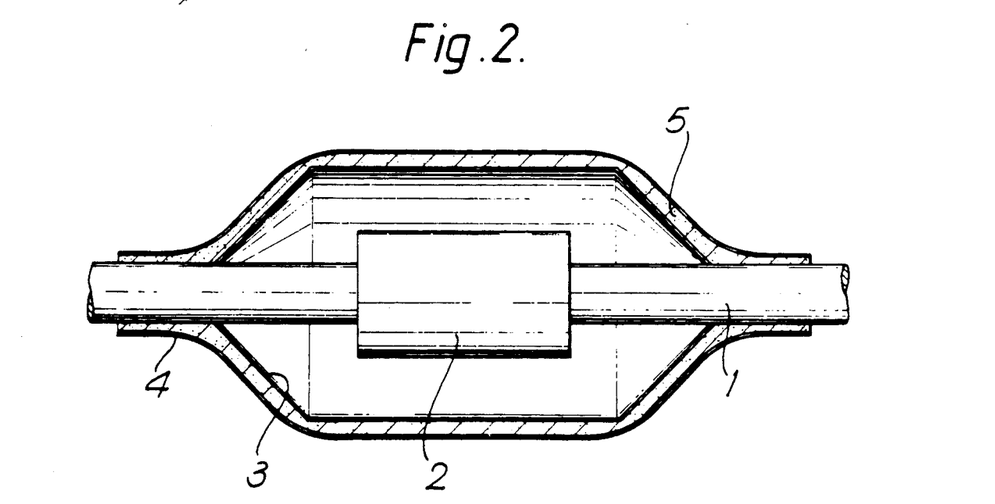
FIG. 2 shows a similar joint but with the sleeve after recovery.

Two substrates 1 are jointed at a joint region 2 and surrounded by a liner 3 and recoverable fabric sleeve 4. In FIG. 1 the sleeve is shown before recovery, and in FIG. 2 it is shown after recovery. In FIG. 2 an adhesive can be seen bonding the sleeve to the substrates 1 and the liner 3. The adhesive is preferably supplied coated to the internal surface of the sleeve. Where recovery is initiated by heat, the adhesive is preferably heat-activatable so that the single step of heating causes recovery of the sleeve and activation of the adhesive. It is not necessary that the adhesive covers the entire surface of the sleeve, and in the embodiment illustrated an adhesive coating may be provided only at the regions where the sleeve meets the cables.

Figure 3:
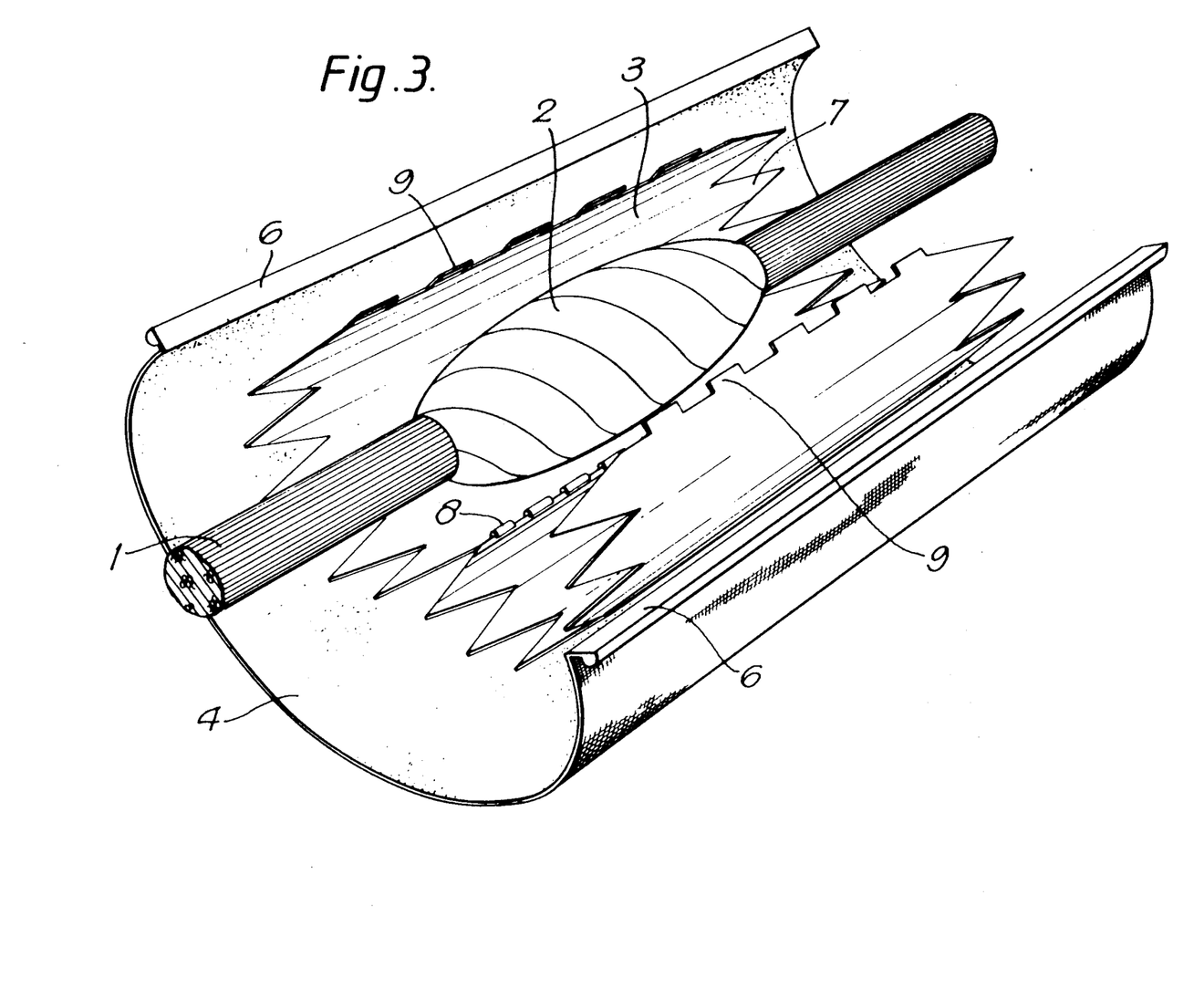
FIG. 3 shows a cable splice partially surrounded by a wrap-around liner and a wrap-around recoverable sleeve.

In FIG. 3 the substrates 1 are shown as multi-conductor cables, and region 2 is a splice bundle joining the two cables. In this Figure both the liner 3 and the fabric sleeve 4 are wrap-around. The liner is hinged at 8 and has castellated edges 9 to ensure rigidity when closed. The sleeve is provided with closure means 6 at its longitudinal edges which can be held together with an elongate channel of C-shaped cross-section. Other types of closure may be used and in general what is preferred is a mechanical closure for maintaining edge regions of the fabric in proximate relationship during recovery. The liner has crowned ends 7 which provide transitions from its central region to the cables 1 and which locate the liner with respect to the cables, thereby allowing production of a hollow pressure vessel having outlet portions only recovered into engagement with the cables.

Figure 4:
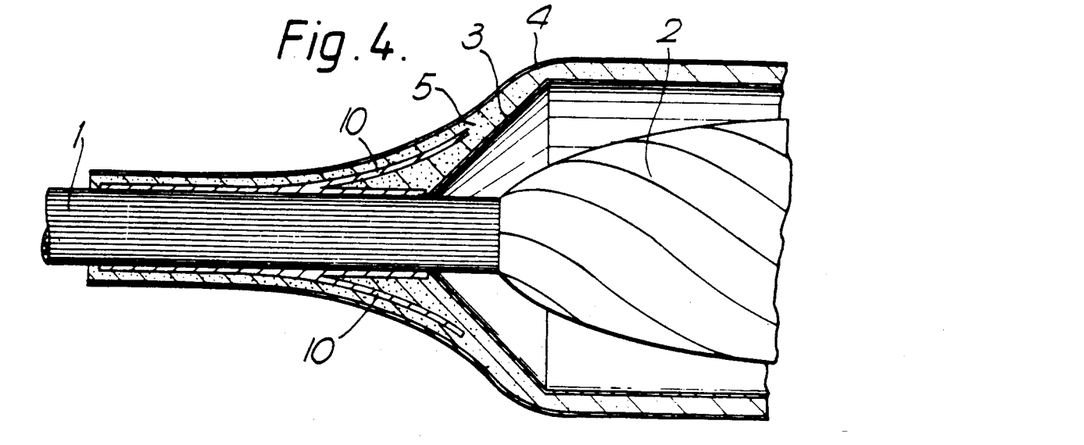
FIG. 4 shows an end of a splice case having an auxiliary member to aid pressure retention.

In FIG. 4 an auxiliary member 10 is shown to aid pressure retention within the splice case. The auxiliary member can present, for example, a concave or reentrant surface to pressure within the splice case and this puts the adhesive bonding the sleeve 4 to the cable 1 out of peel. The auxiliary member may be a strip of material of generally U or V cross-section that is wrapped around the cable such that one limb engages the cable, and the other engages the sleeve.

Figure 5:
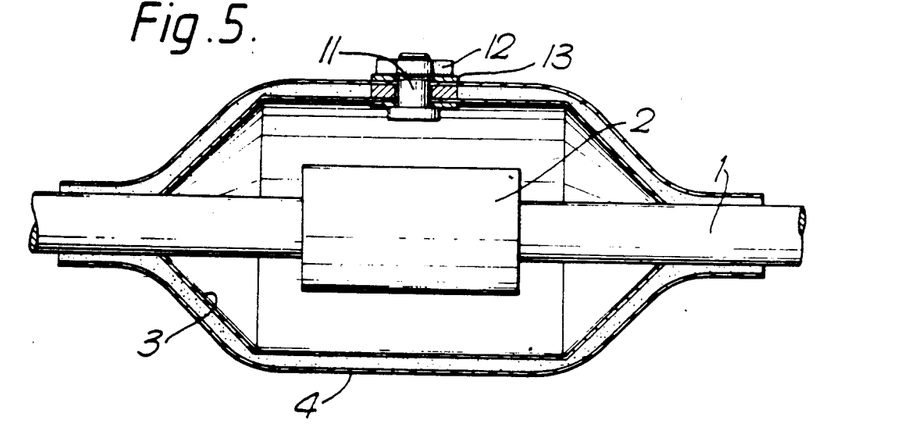
FIG. 5 shows a liner and a sleeve bearing a valve.

A valve 11 is shown in FIG. 5, by means of which the splice case can be pressurized or monitored. The valve is secured to the liner and sleeve by means of a nut 12 which engages a screw thread on the shaft of the valve. Various washers 13 are provided to ensure an air tight seal. The valve, or other appendage, can be used to locate the sleeve with respect to the liner, or can provide a means by which the liner can be earthed.

Figure 6:
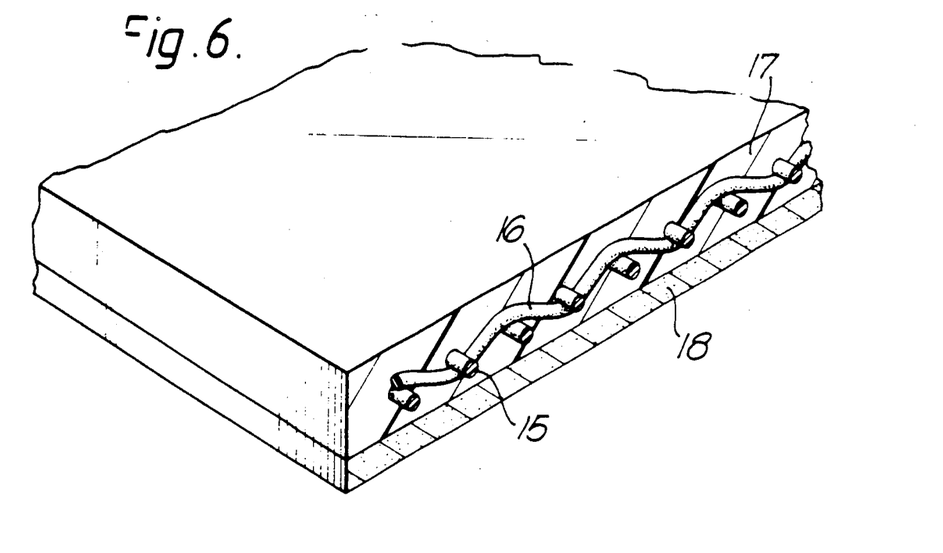
FIG. 6 shows a composite recoverable fabric.

An end of a composite recoverable fabric is shown in FIG. 6. The fabric comprises a warp 15 and a weft 16 embeded in a matrix material 17 by means of which the fabric is rendered impervious to air. an adhesive coating 18 is provided on one side of the fabric.

We claim:

1. A method of making a recoverable composite structure comprising a polymeric material and recoverable fibers by virtue of which the structure is recoverable, which method comprises:

(A) applying the polymeric material to recoverable fibers; and (B) irradiating the resulting structure;

the beam response of the recoverable fibers relative to that of the polymeric material being such that a post-irradiation recovery stress of the fibers per se, of at least 1 MPa can be reached before the recovery ratio of the composite structure is reduced to a value of 70% of that of the unirradiated composite structure.

2. A method according to claim 1, wherein the relative beam response is produced by the presence of pro-rads in the recoverable fibers and/or antirads in the polymeric material.

3. A method according to claim 1 wherein the fibers are cross-linked by irradiation before application of the polymeric material.

4. A method according to claim 1 wherein the fibers are irradiated in the presence of oxygen.

5. A method according to claim 4 wherein the irradiation of the polymeric material produces a bond between the recoverable fibers and the polymeric material.

6. A method according to claim 1 wherein the polymeric material is applied by press lamination, hot-coating from the melt, spray coating or powder coating.

7. A method according to claim 1 which additionally comprises applying a coating of heat-activatable adhesive to the result composite structure.

8. A method according to claim 1 wherein recoverable fibers are cross-linked and then formed into a fabric.

9. The product produced according to the method of claim 1.

* * * * *

UNITED STATES PATENT AND TRADEMARK OFFICE
CERTIFICATE OF CORRECTION

PATENT NO. : 5,002,822

DATED : March 26, 1991

INVENTOR(S) : Pithouse, Kenneth B.; Kridl, Thomas A.; Triplett, James T.

It is certified that error appears in the above-identified patent and that said Letters Patent is hereby corrected as shown below:

Title Page, please insert the following:

--[73] Assignee: Raychem Limited, London, England--.

Signed and Sealed this

Twenty-seventh Day of October, 1992

Attest:

DOUGLAS B. COMER

Attesting Officer

Acting Commissioner of Patents and Trademarks

UNITED STATES PATENT AND TRADEMARK OFFICE

CERTIFICATE OF CORRECTION

PATENT NO. : 5,002,822

INVENTOR(S) : Pithouse et al.

DATED : March 26, 1991

It is certified that error appears in the above-identified patent and that said Letters Patent is hereby corrected as shown below:

Cover page after "primary Examiner-James Seidleck," insert as a separate line--Attorney, Agent or Firm-A. Stephen Zavell, Herbert G. Burkard--.

Column 5, line 10 replace "unform" by--uniform--.

Column 6, line 6 replace "800-2000," by--800-2000%--.

Column 6, line 44 replace "herring bone" by--herring bone,--

Column 7, line 22 replace "5x10,-2" by--$5x10^{-2}$,--.

Column 7, line 23 replace "5x10-1" by--$5x10^{-1}$,--.

Column 7, line 58 replace "desirable" by--desirably--.

Column 8, line 6 replace "moleuiar" by--molecular--.

UNITED STATES PATENT AND TRADEMARK OFFICE
CERTIFICATE OF CORRECTION

PATENT NO. : 5,002,822

INVENTOR(S) : Pithouse et al.

DATED : March 26, 1991

It is certified that error appears in the above-identified patent and that said Letters Patent is hereby corrected as shown below:

```
    Column 8, line 11 replace "in" by--is--.

Column 8, lines 49 to 50 replace "fluoride" by--fluoride.--.

Column 9, line 63 replace "a" by--and--.

Column 10, line 55 replace "cary" by--carry--.

Column 12, line 25 replace "foram" by--foam--.

Column 14, Table II, last line of notes replace "m.tpt"
by--m.pt.--.

Column 17, line 11 replace "an" by--An--.
```

Signed and Sealed this

Nineteenth Day of December, 1995

Attest:

BRUCE LEHMAN

*Attesting Officer*    *Commissioner of Patents and Trademarks*